United States Patent [19]

Ito et al.

[11] Patent Number: 5,378,766

[45] Date of Patent: Jan. 3, 1995

[54] PROCESS FOR THE PREPARATION OF CHLORINATED POLYOLEFIN AND CHLOROSULFONATED POLYOLEFIN

[75] Inventors: Nobuyuki Ito; Katsushige Okayama; Toshinori Karasuda; Yasumichi Miyagawa, all of Yamaguchi, Japan

[73] Assignee: Tosoh Corporation, Yamaguchi, Japan

[21] Appl. No.: 156,904

[22] Filed: Nov. 24, 1993

[30] Foreign Application Priority Data

Nov. 25, 1992 [JP] Japan .................................. 4-314874
Nov. 25, 1992 [JP] Japan .................................. 4-314875

[51] Int. Cl.$^6$ ................................................ C08F 8/00
[52] U.S. Cl. ............................. 525/333.8; 525/333.9; 525/334.1; 525/356
[58] Field of Search ................ 525/333.8, 333.9, 334.1

[56] References Cited

U.S. PATENT DOCUMENTS

| 4,663,396 | 5/1987 | Nakagawa et al. | |
| 4,871,815 | 10/1989 | Nakagawa et al. | 525/333.9 |
| 5,242,987 | 9/1993 | Brugel | 525/333.9 |

FOREIGN PATENT DOCUMENTS

| 0133294 | 2/1985 | European Pat. Off. | 525/334.1 |
| 59-15406 | 1/1984 | Japan | 525/333.9 |
| 60-1206 | 1/1985 | Japan | 525/333.8 |
| 60-144306 | 7/1985 | Japan | |
| 61-120808 | 6/1986 | Japan | 525/333.9 |
| 61-120810 | 6/1986 | Japan | 525/333.9 |
| 2127833 | 4/1984 | United Kingdom | |
| 2246135 | 1/1991 | United Kingdom | |

*Primary Examiner*—Joseph L. Schofer
*Assistant Examiner*—N. Sarofim
*Attorney, Agent, or Firm*—Sughrue, Mion, Zinn, Macpeak & Seas

[57] ABSTRACT

A novel process for the preparation of a chlorinated polyolefin having excellent low temperature characteristics and brightness is provided which comprises allowing a polyolefin dissolved or suspended in a solvent to undergo chlorination reaction with chlorine gas or chlorinated sulfuryl in the presence of a radical initiator as a catalyst, characterized in that as said solvent there is used 1,1,2-trichloroethane and the temperature is controlled to 90° C. or lower at the process for removing hydrogen chloride and/or sulfur dioxide by-produced during the reaction from the reaction system. A further process for the preparation of a chlorosulfonated polyolefin having excellent low temperature characteristics and brightness is provided which comprises allowing a polyolefin dissolved or suspended in a solvent to undergo chlorosulfonation reaction with chlorine and sulfur dioxide, chlorine and sulfuryl chloride, sulfuryl chloride alone, chlorine, sulfur dioxide and sulfuryl chloride or sulfuryl chloride and sulfur dioxide in the presence of a radical initiator as a catalyst, characterized in that as said solvent there is used 1,1,2-trichloroethane and the temperature is controlled to 90° C. or lower at the process for removing hydrogen chloride and/or sulfur dioxide by-produced during the reaction from the reaction system.

5 Claims, No Drawings

PROCESS FOR THE PREPARATION OF CHLORINATED POLYOLEFIN AND CHLOROSULFONATED POLYOLEFIN

FIELD OF THE INVENTION

The present invention relates to a process for the preparation of a chlorinated polyolefin and a chlorosulfonated polyolefin. More particularly, the present invention relates to a process for the preparation of a chlorinated polyolefin and a chlorosulfonated polyolefin having excellent low temperature characteristics and brightness which comprises allowing a polyolefin to undergo chlorination or chlorosulfonation reaction in the form of solution or suspension in 1,1,2-trichloroethane.

BACKGROUND OF THE INVENTION

A chlorinated polyolefin is prepared by chlorinating a polyolefin in the form of solution or suspension in a solvent. Such a chlorinated polyolefin molecule contains 10 to 80% by weight of chlorine. The chlorinated polyolefin is used in vulcanized or unvulcanized form. Because of its excellent fire retardance, weathering resistance, ozone resistance, chemical resistance and electrical characteristics, the chlorinated polyolefin is utilized as a modifier for resin such as polyvinyl chloride, bright electric wire, bright sponge, etc.

On the other hand, a chlosulfonated polyolefin is prepared by chlorosulfonating a polyolefin in the form of solution or suspension in a solvent. Such a chlorosulfonated polyolefin molecule contains 20 to 60% by weight of chlorine and 0.3 to 3.0% by weight of sulfur. The chlorosulfonated polyolefin can be easily vulcanized in the presence of a metallic oxide and vulcanization accelerator to prepare an elastomer having excellent weathering resistance, ozone resistance, heat resistance, chemical resistance and brightness.

However, one of the disadvantages of a chlorinated polyolefin and chlorosulfonated polyolefin is poor cold resistance.

With reference to the chlorosulfonated polyolefin, JP-A-60-144306 (the term "JP-A" as used herein means an "unexamined published Japanese patent application") proposes a process for the preparation of a chlorosulfonated polyolefin having excellent low temperature characteristics by using an aromatic compound as a solvent for the purpose of overcoming the foregoing difficulty. However, a chlorosulfonated polyolefin prepared by using an aromatic compound as a solvent is disadvantageous in that it can be easily colored during heat aging.

On the other hand, the solution which has undergone the chlorination or chlorosulfonation reaction contains hydrogen chloride gas and/or sulfur dioxide gas by-produced during the reaction. These hydrogen chloride and sulfur dioxide gases are corrosive materials. Therefore, it is not preferable from the standpoint of preparation that the chlorinated polyolefin or chlorosulfonated polyolefin is isolated from the solution containing these corrosive materials. Accordingly, these corrosive materials are excluded from the reaction system before the isolation of chlorinated polyolefin or chlorosulfonated polyolefin. Heretofore, in order to exclude hydrogen chloride gas and/or sulfur dioxide gas by-produced during the reaction from the reaction system, an approach has been employed which comprises blowing nitrogen through the reaction system at the boiling point of the solvent used. However, this approach is disadvantageous in the case where a high boiling solvent (e.g., solvent having a boiling point of 100° C. or higher) is used to prepare a chlorinated polyolefin or chlorosulfonated polyolefin in that if hydrogen chloride and/or sulfur dioxide by-produced at the boiling point of the solvent used is excluded from the reaction system, a colored chlorinated polyolefin or chlorosulfonated polyolefin is obtained.

The foregoing problem of coloring drastically impairs the desired brightness of the chlorinated polyolefin or chlorosulfonated polyolefin. It has thus been desired to solve this problem.

SUMMARY OF THE INVENTION

It is therefore an object of the present invention to provide a process for the preparation of a commercially valuable chlorinated polyolefin and chlorosulfonated polyolefin having excellent low temperature characteristics and brightness by using 1,1,2-trichloroethane as a solvent.

The foregoing and other objects of the present invention will become more apparent from the following detailed description and examples.

The foregoing object of the present invention is accomplished by a process for the preparation of a chlorinated polyolefin having excellent low temperature characteristics and brightness which comprises allowing a polyolefin dissolved or suspended in a solvent to undergo chlorination reaction with chlorine gas or chlorinated sulfuryl in the presence of a radical initiator as a catalyst, characterized in that as said solvent there is used 1,1,2-trichloroethane and the temperature is controlled to 90° C. or lower at the process for removing hydrogen chloride and/or sulfur dioxide by-produced during the reaction from the reaction system. The foregoing object of the present invention is also accomplished by a process for the preparation of a chlorosulfonated polyolefin having excellent low temperature characteristics and brightness which comprises allowing a polyolefin dissolved or suspended in a solvent to undergo chlorosulfonation reaction with chlorine and sulfur dioxide, chlorine and sulfuryl chloride, sulfuryl chloride alone, chlorine, sulfur dioxide and sulfuryl chloride or sulfuryl chloride and sulfur dioxide in the presence of a radical initiator as a catalyst, characterized in that as said solvent there is used 1,1,2-trichloroethane and the temperature is controlled to 90° C. or lower at the process for removing hydrogen chloride and/or sulfur dioxide by-produced during the reaction from the reaction system.

DETAILED DESCRIPTION OF THE INVENTION

As the solvent to be used in the present invention, 1,1,2-trichloroethane is used. The amount of the solvent is from 2.5 times to 35 times, preferably from 4 times to 20 times based on the weight of polyethylene as a raw material.

In the chlorination reaction, chlorine gas or sulfuryl chloride is allotted to undergo reaction with a polyolefin dissolved or suspended in 1,1,2-trichloroethane in the presence of a radical initiator as a catalyst. The reaction temperature is in the range of 40° C. to 150° C., preferably 60° C. to 130° C. The reaction pressure is in the range of 0 to 10 kg/cm$^2$, preferably 0 to 7 kg/cm$^2$. As the radical initiator, there may be used an azo compound or organic peroxide. Examples of the azo compound include α, α'-azobisisobutyronitrile, azobiscyclohexanecarbonitrile, and 2,2'-azobis(2,4-dimethylvaleronitrile). Examples of the organic peroxide include benzoyl peroxide, acetyl peroxide, t-butyl peroxide, and t-butyl perbenzoate. Preferred among these radical initiators are azo compounds. Particularly preferred among these azo compounds is α, α'-azobisisobutyronitrile.

On the other hand, in the chlorination and chlorosulfonation reaction, chlorine and sulfur dioxide gas, chlorine and sulfuryl chloride, sulfuryl chloride alone, chlorine, sulfur dioxide and sulfuryl chloride or sulfuryl chloride and sulfur dioxide gas are allowed to undergo reaction with a polyolefin dissolved or suspended in 1,1,2-trichloroethane in the presence of a radical initiator as a catalyst. In the case where sulfuryl chloride is added, an amine compound such as pyridine and quinoline is optionally added as a cocatalyst. The reaction temperature is in the range of 40° C. to 150° C., preferably 60° C. to 130° C. The reaction pressure is in the range of 0 to 10 kg/cm$^2$, preferably 0 to 7 kg/cm$^2$.

As the radical initiator, there may be used an azo compound or organic peroxide. Examples of the azo compound include α, α'-azobisisobutyronitrile, azobiscyclohexane-carbonitrile, and 2,2,'-azobis(2,4-dimethylvaleronitrile). Examples of the organic peroxide include benzoyl peroxide, acetyl peroxide, t-butyl peroxide, and t-butyl perbenzoate. Preferred among these radical initiators are azo compounds. Particularly preferred among these azo compounds is α, α'-azobisisobutyronitrile.

Examples of the polyolefin to be used as a starting material include ethylene homopolymers or copolymers such as high density polyethylene (HDPE), low density polyethylene (LDPE), linear low density polyethylene (LLDPE), very low density polyethylene (VLDPE), ethylene-vinyl acetate copolymer (EVA) and ethylene-propylene copolymer (EPM).

After the completion of the reaction, hydrogen chloride gas and/or sulfur dioxide gas remaining in the reaction solution is removed by introducing nitrogen into the reaction solution. Alternatively, hydrogen chloride gas and/or sulfur dioxide gas may be removed under reduced pressure without any problem. In this case, it is important that the temperature in the reaction system is not higher than 90° C., preferably 50° C. to 90° C. If hydrogen chloride gas and/or sulfur dioxide gas are removed at a reaction system temperature of higher than 90° C., colored chlorinated polyolefin and chlorosulfonated polyolefin are obtained.

The removal of hydrogen chloride gas and/or sulfur dioxide gas may be optionally effected with the addition of a stabilizer. As such a stabilizer, there may be preferably used an epoxy compound such as 2,2'-bis(4-glycidyloxyphenyl)propane.

As means of separating the polymer as a product from the solvent, there are known steam distillation, drum dryer, and vented extruder. By using these methods, the polymer is separated from the solvent.

The chlorinated polyolefin as defined herein depends on the kind of the polyolefin to be used as a starting material. Examples of such a chlorinated polyolefin include chlorinated polyethylene, chlorinated ethylene-propylene copolymer, chlorinated ethylene-butene copolymer, chlorinated ethylene-hexene copolymer, and chlorinated ethylene-vinyl acetate copolymer.

On the other hand, the chlorosulfonated polyolefin as defined herein depends on the kind of the polyolefin to be used as a starting material. Examples of such a chlorosulfonated polyolefin include chlorosulfonated polyethylene, chlorosulfonated ethylene-propylene copolymer, chlorosulfonated ethylene-butene copolymer, chlorosulfonated ethylene-hexene copolymer, and chlorosulfonated ethylene-vinyl acetate copolymer.

The resulting product is blended and kneaded with other components in the same manner as in the conventional rubber or resin. Such a product is then used in vulcanized or unvulcanized form. Examples of the components to be blended include vulcanizing agent such as magnesia and calcium hydroxide, reinforcing agent such as carbon black and white carbon, filler such as calcium carbonate and talc, plasticizer, processing aid, aging inhibitor, and rubber component such as vulcanization accelerator (e.g., DPTT, TMTD). As means of vulcanizing there may be used an ordinary method such as steam vulcanization, UHF vulcanization, hot-air vulcanization, injection, mold and rotocure.

Similar to chlorinated polyolefins already existing, the chlorinated polyolefin obtained according to the present invention has end uses such as wire covering material, modification of resin such as polyvinyl chloride, PE, PP, PS and ABS, rubber magnet, light electrical parts, automobile parts, rubber parts, waterproof sheet, sponge, etc.

On the other hand, similar to chlorosulfonated polyolefins already existing, the chlorosulfonated polyolefin obtained according to the present invention has end uses such as automobile hose, gas hose, industrial hose, escalator handrail, electric wire, leisure boat, roofing, bond liner, roll, belt, boot, packing, sheet, coated cloth, adhesive, coating compound, sealant, etc.

The present invention will be further described in the following non-limiting examples.

In these examples, the values showing the results of measurements and determinations were obtained according to the following methods:

Chlorine or Sulfur Content: Combustion Flask Method

Physical Properties of Unvulcanized Rubber: JIS K 6300

Physical Properties of Vulcanized Rubber: JIS K 6301

Low Temperature Characteristics (Cold Torsional Test): JIS K 6301

Hue of Product: Visual Observation

Hue Stability of Product in Accelerated Deterioration: 70° C. Gear Oven Method, Visual Observation

EXAMPLE 1

Into a 30-l glass-lined autoclave were charged 28 kg of 1,1,2-trichloroethane and 1.96 kg of a high density polyethylene having a melt index of 3.8 g/10 min and a density of 0.963 g/cc.

By blowing steam through the jacket of the reaction vessel, the reaction system was kept to a temperature of 120° C. for 2 hours to make a uniform solution of polyethylene. During this procedure, nitrogen gas was introduced into the reaction vessel at a flow rate of 15 l/min to remove air which had entered thereinto.

2.65 g of α, α'-azobisisobutyronitrile as a radical initiator was dissolved in 2.9 kg of 1,1,2-trichloroethane. This solution was continuously added to the reaction system while chlorine gas was fed into the reaction vessel through another inlet at a flow rate of 6 l/min for 130 minutes to effect the desired reaction. The reaction temperature was kept to 115° C. The pressure in the reaction vessel was kept to 3.5 kg/cm$^2$.

After the completion of the reaction, the pressure was returned to atmospheric pressure and the temperature in the reaction vessel was lowered to 70° C. While the reaction solution was kept at that temperature, nitrogen was then introduced thereinto to remove the remaining chlorine gas and hydrogen chloride gas therefrom.

To the reaction solution, 43 g of 2,2'-bis(4-glycidyloxyphenyl)propane was added to the reaction solution as a stabilizer. This reaction solution was then fed to a drum dryer which had been heated to a temperature of 155° C., thereby to separate a chlorinated polyethylene as a product from the solvent.

The product exhibited a pure white hue. Upon analysis, it was found that the chlorinated polyethylene contained 35.7% by weight of chlorine. The crude rubber exhibited a Mooney viscosity (ML$_{1+4}$, 100° C.) of 63.

The hue stability of the product was examined by an accelerated heat deterioration test, but no hue change was observed even after the passage of 10 days at a temperature of 70° C.

Further, the product was blended and kneaded with other components as set forth in Table 1, and then measured for physical properties of unvulcanized product (scorch time) and physical properties of vulcanized product.

TABLE 1

| | Parts by weight |
|---|---|
| Chlorinated polyethylene | 100 |
| Magnesia | 10 |
| SRF*$^{1)}$ | 30 |
| DOS*$^{2)}$ | 10 |
| TAIC*$^{3)}$ | 4 |
| DCP*$^{4)}$ | 3 |

*$^{1)}$Carbon black
*$^{2)}$Di-(2-ethylhexyl) sebacate
*$^{3)}$Triallyl isocyanurate
*$^{4)}$Dicumyl peroxide The results are set forth in Table 2.

EXAMPLE 2

A reaction was effected in the same manner as in Example 1, except that the polyolefin to be used as a starting material was changed to a high density polyethylene having a melt index of 1.1 g/min and a density of 0.965 g/cc and chlorine gas was introduced into the reaction system at a flow rate of 6 l/min. for 150 minutes. Subsequently, the product was separated.

The product exhibited a pure white hue. Upon analysis, it was found that the chlorinated polyethylene contained 36.9% by weight of chlorine. The crude rubber exhibited a Mooney viscosity (ML$_{1+4}$, 100° C.) of 103.

The hue stability of the product was examined by an accelerated heat deterioration test, but no hue change was observed even after the passage of 10 days at a temperature of 70° C.

Further, the product was blended and kneaded with other components as set forth in Table 1, and then measured for physical properties of unvulcanized product and vulcanized product.

The results are set forth in Table 2.

EXAMPLE 3

A reaction was effected in the same manner as in Example 1, except that the polyolefin to be used as a starting material was changed to a linear low density polyethylene having a melt index of 5.0 g/min and a density of 0.921 g/cc (ethylene-butene-1 copolymer) and chlorine gas was introduced into the reaction system at a flow rate of 6 l/min for 85 minutes. Subsequently, the product was separated.

The product exhibited a pure white hue. Upon analysis, it was found that the chlorinated ethylene-butene-1 copolymer contained 27.4% by weight of chlorine. The crude rubber exhibited a Mooney viscosity (ML$_{1+4}$, 100° C.) of 40.

The hue stability of the product was examined by an accelerated heat deterioration test, but no hue change was observed even after the passage of 10 days at a temperature of 70° C.

Further, the product was blended and kneaded with other components as set forth in Table 1, and then measured for physical properties of unvulcanized product and vulcanized product.

The results are set forth in Table 2.

Comparative Example 1

A reaction was effected in the same manner as in Example 1, except that the process for removing hydrogen chloride gas by-produced during the reaction from the reaction system was effected at a temperature of 113° C., which is the boiling point of 1,1,2-trichloroethane as a solvent. Subsequently, the product was separated.

The product exhibited a light yellow hue. Upon analysis, it was found that the chlorinated polyethylene contained 35.5% by weight of chlorine. The crude rubber exhibited a Mooney viscosity (ML$_{1+4}$, 100° C.) of 62.

The hue stability of the product was examined by an accelerated heat deterioration test, but no hue changed was observed even after the passage of 10 days at a temperature of 70° C.

Further, the product was blended and kneaded with other components as set forth in Table 1, and then measured for physical properties of unvulcanized product and vulcanized product.

The results are set forth in Table 2.

The results show that the product has a poor brightness.

Comparative Example 2

A reaction was effected in the same manner as in Example 1, except that carbon tetrachloride was used as the solvent and the process for removing hydrogen chloride gas by-produced during the reaction from the reaction system was effected at a temperature of 76.8° C., which is the boiling point of carbon tetrachloride as a solvent. Subsequently, the product was separated.

The product exhibited a pure white hue. Upon analysis, it was found that the chlorinated polyethylene contained 35.4% by weight of chlorine. The crude rubber exhibited a Mooney viscosity (ML$_{1+4}$, 100° C.) of 62.

The hue stability of the product was examined by an accelerated heat deterioration test, but no hue change was observed even after the passage of 10 days at a temperature of 70° C.

Further, the product was blended and kneaded with other components as set forth in Table 1, and then measured for physical properties of unvulcanized product and vulcanized product.

The results are set forth in Table 2.

The results show that the product has poor low temperature characteristics.

Comparative Example 3

A reaction was effected in the same manner as in Example 1, except that monochlorobenzene was used as the solvent. Subsequently, the product was separated.

The product exhibited a pure white hue. Upon analysis, it was found that the chlorinated polyethylene contained 35.5% by weight of chlorine. The crude rubber exhibited a Mooney viscosity ($ML_{1+4}$, 100° C.) of 61.

The hue stability of the product was examined by an accelerated heat deterioration test. As a result, the product turned to brown after the passage of 5 days at a temperature of 70° C.

Further, the product was blended and kneaded with other components as set forth in Table 1, and then measured for physical properties of unvulcanized product and vulcanized product.

The results are set forth in Table 2.

The results show that the product has a poor brightness.

Comparative Example 4

A reaction was effected in the same manner as in Example 3, except that carbon tetrachloride was used as the solvent and the process for removing hydrogen chloride gas by-produced during the reaction from the reaction system was effected at a temperature of 76.8° C., which is the boiling point of carbon tetrachloride as a solvent. Subsequently, the product was separated.

The product exhibited a pure white hue. Upon analysis, it was found that the chlorinated ethylene-butene-1 copolymer contained 27.2% by weight of chlorine. The crude rubber exhibited a Mooney viscosity ($ML_{1+4}$, 100° C.) of 40.

The hue stability of the product was examined by an accelerated heat deterioration test, but no hue change was observed even after the passage of 10 days at a temperature of 70° C.

Further, the product was blended and kneaded with other components as set forth in Table 1, and then measured for physical properties of unvulcanized product and vulcanized product.

The results are set forth in Table 2.

The results show that the product has poor low temperature characteristics.

The comparison between the foregoing examples and comparative examples shows that the chlorinated polyolefin obtained according to the present invention is a commercially valuable product having excellent low temperature characteristics and a pure white hue.

TABLE 2

|  | Example 1 | Example 2 | Example 3 | Comparative Example 1 | Comparative Example 2 | Comparative Example 3 | Comparative Example 4 |
| --- | --- | --- | --- | --- | --- | --- | --- |
| Chlorine content (%) | 35.7 | 36.9 | 27.4 | 35.5 | 35.4 | 35.5 | 27.2 |
| Mooney viscosity of starting material ($ML_{1+4}$: 100° C.) | 63 | 103 | 40 | 62 | 62 | 61 | 40 |
| Scorch time |  |  |  |  |  |  |  |
| (125° C. ML1) Vm | 37 | 68 | 21 | 35 | 36 | 34 | 21 |
| t5 (min) | 29.2 | 26.8 | 26.3 | 28.5 | 28.9 | 26.8 | 27.6 |
| t35 (min) | 79.5 | 60.5 | 65.1 | 77.3 | 78.8 | 75.6 | 69.3 |
| Physical properties of vulcanized product (vulcanization condition: 160° C. × 20 min) |  |  |  |  |  |  |  |
| Tensile strength TB (kg/cm$^2$) | 195 | 209 | 208 | 192 | 196 | 189 | 215 |
| Elongation EB (%) | 370 | 350 | 360 | 360 | 370 | 380 | 360 |
| Hardness HS (JIS-A) | 67 | 69 | 68 | 69 | 70 | 66 | 69 |
| 300% Modulus M300 (kg/cm$^2$) | 153 | 195 | 172 | 155 | 160 | 151 | 176 |
| Low temperature characteristics (cold torsional test) |  |  |  |  |  |  |  |
| T2 (°C.) | −13.1 | −12.8 | −13.2 | −13.0 | −9.2 | −17.2 | −11.1 |
| T5 (°C.) | −15.8 | −15.5 | −18.9 | −15.7 | −13.5 | −21.4 | −17.2 |
| T10 (°C.) | −17.7 | −17.3 | −21.5 | −17.6 | −15.1 | −22.0 | −19.7 |
| T100 (°C.) | −22.6 | −22.4 | −30.8 | −22.5 | −22.2 | −23.2 | −29.1 |
| Hue | white | white | white | light yellow | white | white | white |
| Hue change (70° C. × 10 days) | none | none | none | none | none | brown | none |

EXAMPLE 4

Into a 30-l glass-lined autoclave were charged 28 kg of 1,1,2-trichloroethane and 2.8 kg of a high density polyethylene having a melt index of 6.2 g/10 min and a density of 0.95 g/cc.

To the reaction system was then added 0.3 g of pyridine as a cocatalyst for chlorosulfonation reaction. By blowing steam through the jacket of the reaction vessel, the reaction system was kept to a temperature of 120° C. for 2 hours to make a uniform solution of polyethylene. During this procedure, nitrogen gas was introduced into the reaction vessel at a flow rate of 15 l/min to exclude air which had entered thereinto.

14 g of α, α'-azobisisobutyronitrile as a radical initiator was dissolved in 2.9 kg of 1,1,2-trichloroethane from which 1-butanol and 1,2-epoxybutane had been removed. This solution was continuously added to the reaction system while 5.9 kg of sulfuryl chloride was fed into the reaction vessel through another inlet to effect the desired reaction. The reaction took 3 hours. The pressure in the reaction vessel was kept to 2.0 kg/cm$^2$.

After the completion of the reaction, the pressure was returned to atmospheric pressure and the temperature in the reaction vessel was lowered to 70° C. While the reaction solution was kept at that temperature, nitrogen was then introduced thereinto to remove the remaining sulfur dioxide gas and hydrogen chloride gas therefrom.

To the reaction solution, 43 g of 2,2'-bis(4-glycidyloxyphenyl)propane was added as a stabilizer. This reaction solution was then fed to a drum dryer which had been heated to a temperature of 155° C., thereby to separate a chlorosulfonated polyethylene as a product from the solvent.

The product exhibited a pure white hue. Upon analysis, it was found that the chlorosulfonated polyethylene contained 35.5% by weight of chlorine and 1.0% by weight of sulfur. The crude rubber exhibited a Mooney viscosity ($ML_{1+4}$, 100° C.) of 59.

The hue stability of the product was examined by an accelerated heat deterioration test, but no hue change was observed even after the passage of 10 days at a temperature of 70° C.

Further, the product was blended and kneaded with other components as set forth in Table 3, and then measured for physical properties of unvulcanized product (scorch time) and physical properties of vulcanized product.

TABLE 3

|  | Parts by weight |
|---|---|
| Chlorosulfonated polyethylene | 100 |
| Magnesia | 10 |
| Pentaerythritol | 3 |
| Accelerator TRA* | 2 |

*Dipentamethylene thiuram tetrasulfide

The results are set forth in Table 4.

EXAMPLE 5

A reaction was effected in the same manner as in Example 4, except that the polyolefin to be used as a starting material was changed to a high density polyethylene having a melt index of 0.09 g/min and a density of 0.955 g/cc. Subsequently, the product was separated.

The product exhibited a pure white hue. Upon analysis, it was found that the chlorosulfonated polyethylene contained 35.2% by weight of chlorine and 1.0% of sulfur. The crude rubber exhibited a Mooney viscosity ($ML_{1+4}$, 100° C.) of 99.

The hue stability of the product was examined by an accelerated heat deterioration test, but no hue change was observed even after the passage of 10 days at a temperature of 70° C.

Further, the product was blended and kneaded with other components as set forth in Table 3, and then measured for physical properties of unvulcanized product and vulcanized product.

The results are set forth in Table 4.

EXAMPLE 6

A reaction was effected in the same manner as in Example 4, except that the polyolefin to be used as a starting material was changed to a linear low density polyethylene having a melt index of 4.3 g/min and a density of 0.922 g/cc (ethylene-butene-1 copolymer) and the added amount of sulfuryl chloride was changed to 4.0 kg. Subsequently, the product was separated.

The product exhibited a pure white hue. Upon analysis, it was found that the chlorosulfonated ethylene-butene-1 copolymer contained 29.7% by weight of chlorine and 0.9% by weight of sulfur. The crude rubber exhibited a Mooney viscosity ($ML_{1+4}$, 100° C.) of 38.

The hue stability of the product was examined by an accelerated heat deterioration test, but no hue change was observed even after the passage of 10 days at a temperature of 70° C.

Further, the product was blended and kneaded with other components as set forth in Table 3, and then measured for physical properties of unvulcanized product and vulcanized product.

The results are set forth in Table 4.

Comparative Example 5

A reaction was effected in the same manner as in Example 4, except that the process for removing hydrogen chloride gas and/or sulfur dioxide gas by-produced during the reaction from the reaction system was effected at a temperature of 113° C., which is the boiling point of 1,1,2-trichloroethane as a solvent. Subsequently, the product was separated.

The product exhibited a brown hue. Upon analysis, it was found that the chlorinated polyethylene contained 35.1% by weight of chlorine and 1.0% by weight of sulfur. The crude rubber exhibited a Mooney viscosity ($ML_{1+4}$, 100° C.) of 58.

The hue stability of the product was examined by an accelerated heat deterioration test, but no hue changed was observed even after the passage of 10 days at a temperature of 70° C.

Further, the product was blended and kneaded with other components as set forth in Table 3, and then measured for physical properties of unvulcanized product and vulcanized product.

The results are set forth in Table 4.

The results show that the product has a poor brightness.

Comparative Example 6

A reaction was effected in the same manner as in Example 4, except that carbon tetrachloride was used as the solvent and the process for removing hydrogen chloride gas and/or sulfur dioxide gas by-produced during the reaction from the reaction system was effected at a temperature of 76.8° C., which is the boiling point of carbon tetrachloride as a solvent. Subsequently, the product was separated.

The product exhibited a pure white hue. Upon analysis, it was found that the chlorosulfonated polyethylene contained 35.4% by weight. of chlorine and 1.0% by weight of sulfur. The crude rubber exhibited a Mooney viscosity ($ML_{1+4}$, 100° C.) of 59.

The hue stability of the product was examined by an accelerated heat deterioration test, but no hue change was observed even after the passage of 10 days at a temperature of 70° C.

Further, the product was blended and kneaded with other components as set forth in Table 3, and then measured for physical properties of unvulcanized product and vulcanized product.

The results are set forth in Table 4.

The results show that the product has poor low temperature characteristics.

Comparative Example 7

A reaction was effected in the same manner as in Example 4, except that monochlorobenzene was used as the solvent. Subsequently, the product was separated.

The product exhibited a pure white hue. Upon analysis, it was found that the chlorosulfonated polyethylene contained 35.5% by weight of chlorine and 1.0% by weight of sulfur. The crude rubber exhibited a Mooney viscosity ($ML_{1+4}$, 100° C.) of 54.

The hue stability of the product was examined by an accelerated heat deterioration test. As a result, the product turned to brown after the passage of 5 days at a temperature of 70° C., Further, the product was blended and kneaded with other components as set forth in Table 3, and then measured for physical properties of unvulcanized product and vulcanized product.

TABLE 4

|  | Example 4 | Example 5 | Example 6 | Comparative Example 5 | Comparative Example 6 | Comparative Example 7 | Comparative Example 8 |
|---|---|---|---|---|---|---|---|
| Chlorine content (%) | 35.5 | 35.2 | 29.7 | 35.1 | 35.4 | 35.5 | 29.9 |
| Sulfur content (%) | 1.0 | 1.0 | 0.9 | 1.0 | 1.0 | 1.0 | 0.9 |
| Mooney viscosity of starting material ($VL_{1+4}$: 100° C.) | 59 | 99 | 38 | 58 | 59 | 54 | 39 |
| Scorch time |  |  |  |  |  |  |  |
| (125° C. ML1) Vm | 45 | 82 | 52 | 45 | 45 | 46 | 55 |
| t5 (min) | 8.6 | 12.9 | 9.8 | 8.3 | 8.6 | 7.3 | 9.5 |
| t35 (min) | 16.4 | 19.1 | 24.9 | 15.9 | 16.3 | 12.4 | 23.6 |
| Physical properties of vulcanized product (vulcanization condition: 150° C. × 20 min) |  |  |  |  |  |  |  |
| Tensile strength TB ($kg/cm^2$) | 312 | 292 | 283 | 324 | 324 | 245 | 289 |
| Elongation EB (%) | 538 | 527 | 525 | 521 | 538 | 537 | 535 |
| Hardness HS (JIS-A) | 59 | 56 | 59 | 60 | 60 | 59 | 60 |
| 300% Modulus M300 ($kg/cm^2$) | 60 | 54 | 56 | 62 | 63 | 60 | 56 |
| Low temperature characteristics (cold torsional test) |  |  |  |  |  |  |  |
| T2 (°C.) | −15.2 | −13.2 | −15.0 | −15.1 | −11.4 | −19.1 | −12.8 |
| T5 (°C.) | −17.5 | −16.4 | −21.0 | −17.3 | −15.8 | −23.3 | −18.8 |
| T10 (°C.) | −19.9 | −18.2 | −23.7 | −19.7 | −17.6 | −24.2 | −22.1 |
| T100 (°C.) | −24.6 | −24.3 | −32.6 | −24.5 | −24.1 | −25.6 | −30.8 |
| Hue | white | white | white | brown | white | white | white |
| Hue change (70° C. × 10 days) | none | none | none | none | none | brown | none |

The results are set forth in Table 4.

The results show that the product has a poor brightness.

Comparative Example 8

A reaction was effected in the same manner as in Example 6, except that carbon tetrachloride was used as the solvent and the process for removing hydrogen chloride gas and/or sulfur dioxide gas by-produced during the reaction from the reaction system was effected at a temperature of 76.8° C., which is the boiling point of carbon tetrachloride as a solvent. Subsequently, the product was separated.

The product exhibited a pure white hue. Upon analysis, it was found that the chlorosulfonated ethylene-butene-1 copolymer contained 29.9% by weight of chlorine and 0.9% by weight of chlorine. The crude rubber exhibited a Mooney viscosity ($ML_{1+4}$, 100° C.) of 39.

The hue stability of the product was examined by an accelerated heat deterioration test, but no hue change was observed even after the passage of 10 days at a temperature of 70° C.

Further, the product was blended and kneaded with other components as set forth in Table 3, and then measured for physical properties of unvulcanized product and vulcanized product.

The results are set forth in Table 4.

The results show that the product has poor low temperature characteristics.

The comparison between the foregoing examples and comparative examples shows that the chlorosulfonated polyolefin obtained according to the present invention is a commercially valuable product having excellent low temperature characteristics and a pure white hue.

The present invention establishes a process for the preparation of a chlorinated polyolefin and a chlorosulfonated polyolefin by using 1,1,2-trichloroethane as a solvent. The chlorinated polyolefin and chlorosulfonated polyolefin obtained according to the present invention are excellent in low temperature characteristics and brightness, making it possible to add to its commercial value.

While the invention has been described in detail and with reference to specific embodiments thereof, it will be apparent to one skilled in the art that various changes and modifications can be made therein without departing from the spirit and scope thereof.

What is claimed is:

1. A process for the preparation of a chlorosulfonated polyolefin having excellent low temperature characteristics and brightness which comprises allowing a polyolefin dissolved or suspended in a solvent to undergo chlorosulfonation reaction with chlorine and sulfur dioxide, chlorine and sulfuryl chloride, sulfuryl chloride alone, chlorine, sulfur dioxide and sulfuryl chloride or sulfuryl chloride and sulfur dioxide in the presence of a radical initiator as a catalyst, wherein i) 1,1,2-trichloroethane is used as the solvent and ii) the temperature is controlled to 90° C. or lower at the process for removing hydrogen chloride and/or sulfur dioxide by-produced during the reaction from the reaction system.

2. The process of claim 1, wherein the reaction temperature is in the range of 40° C. to 150° C.

3. The process of claim 1, wherein the reaction temperature is in the range of 60° C. to 130° C.

4. The process of claim 1, wherein the reaction pressure is in the range of 0 to 10 $kg/cm^2$.

5. The process of claim 1, wherein the reaction pressure is in the range of 0 to 7 $kg/cm^2$.

* * * * *